June 5, 1923.

P. C. WITHROW ET AL

VALVE

Filed July 10, 1920

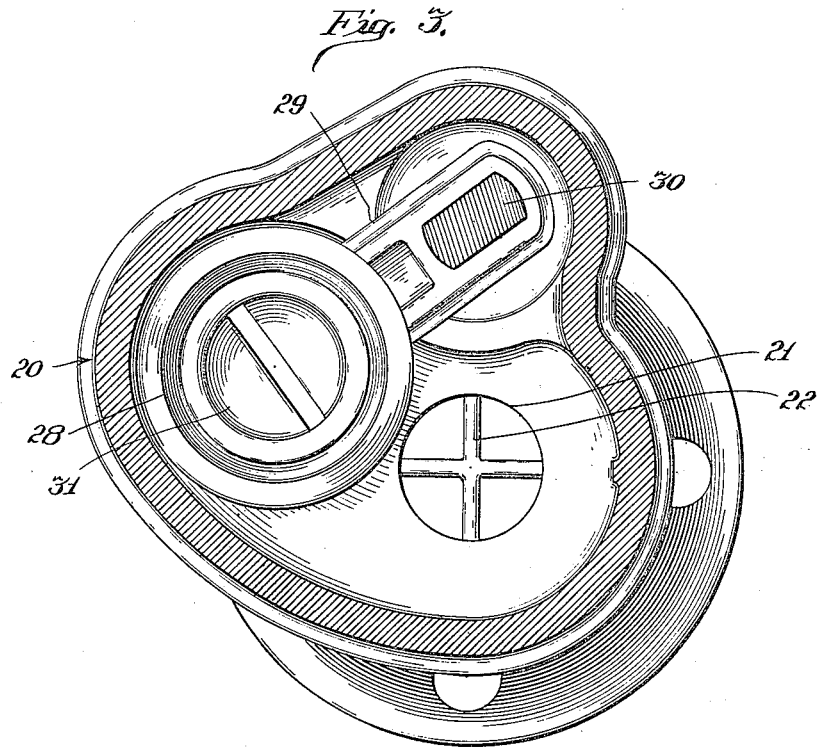
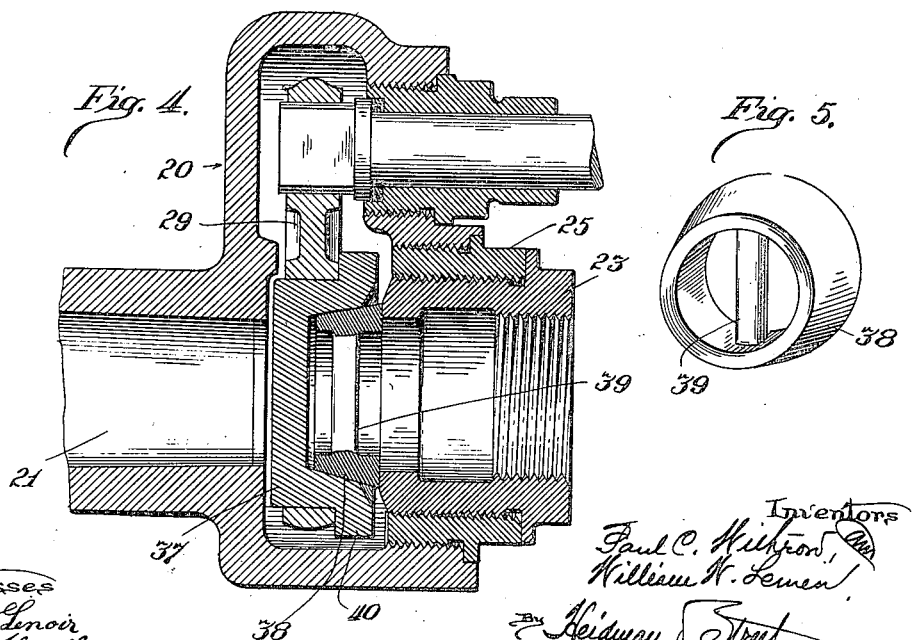
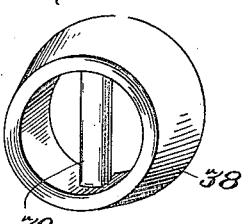

June 5, 1923.                                              1,457,613
P. C. WITHROW ET AL
VALVE
Filed July 10, 1920                              5 Sheets-Sheet 3
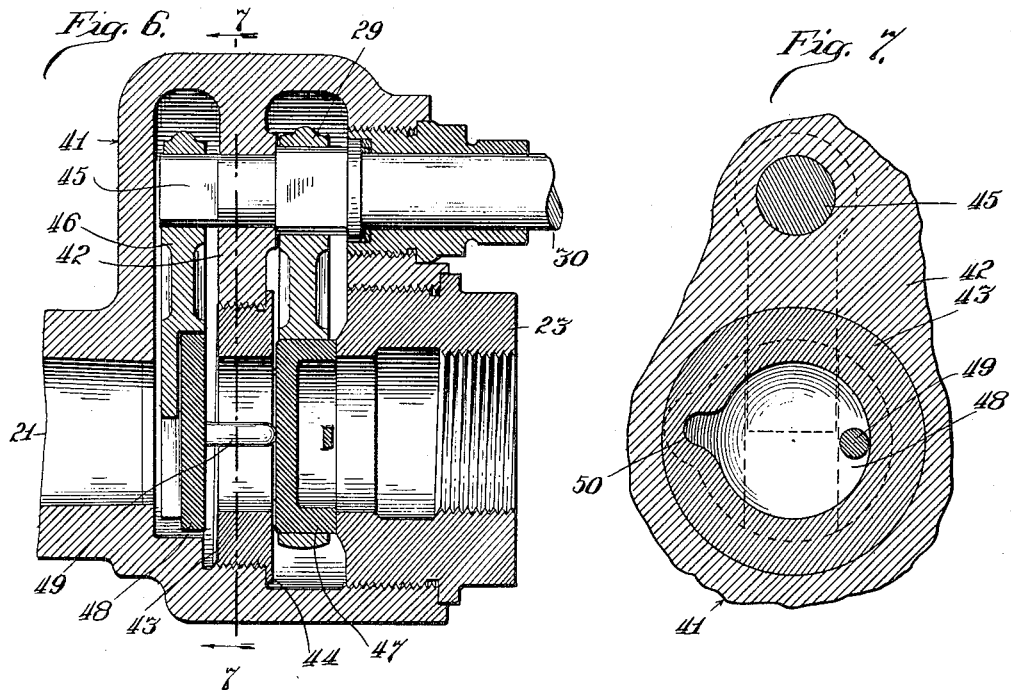
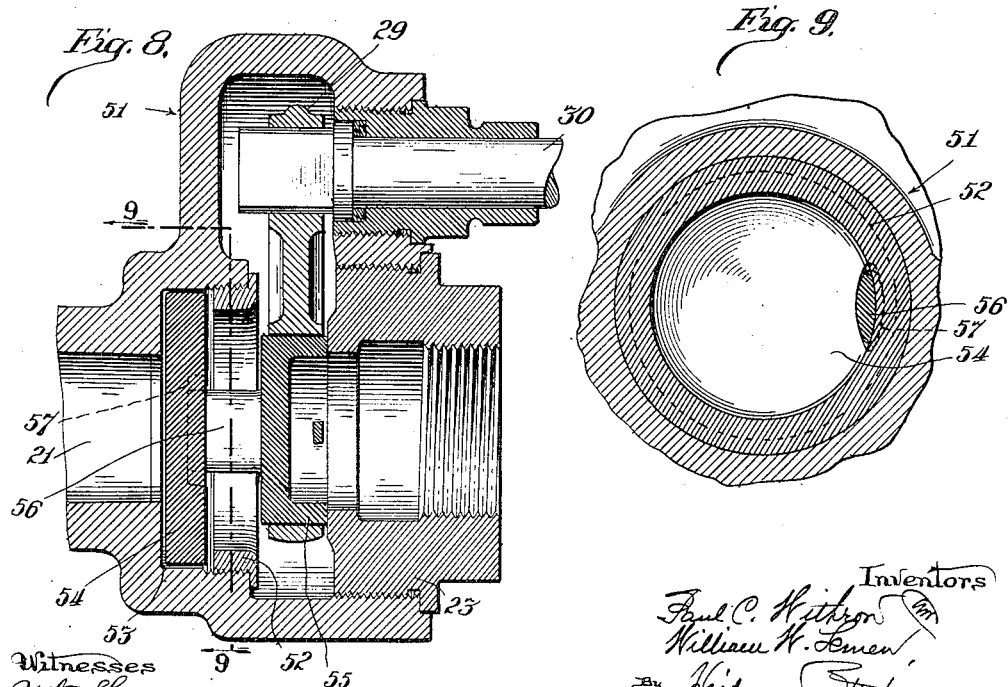

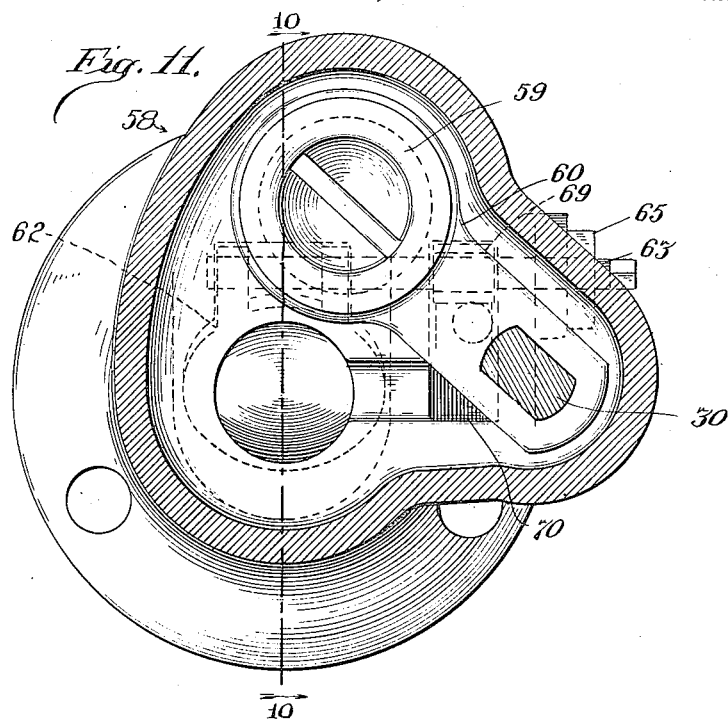
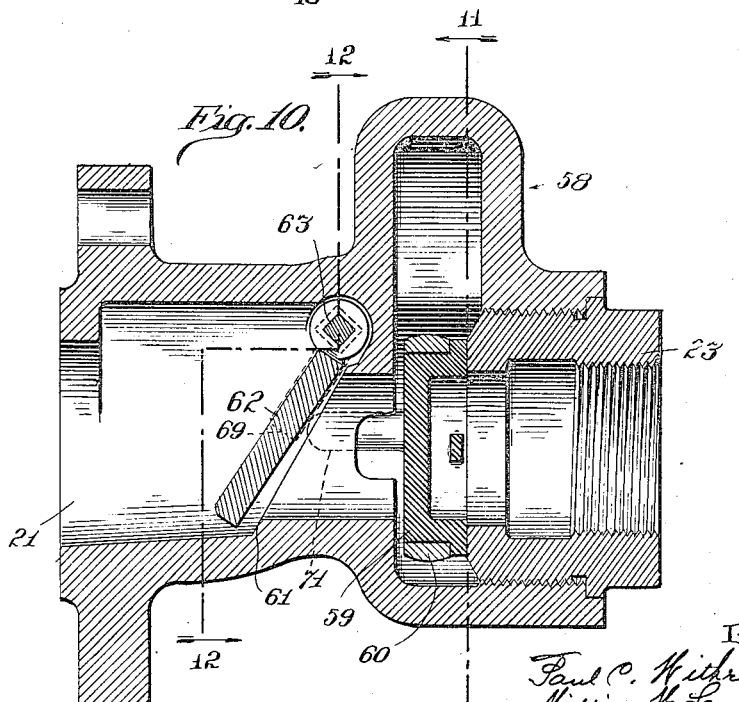

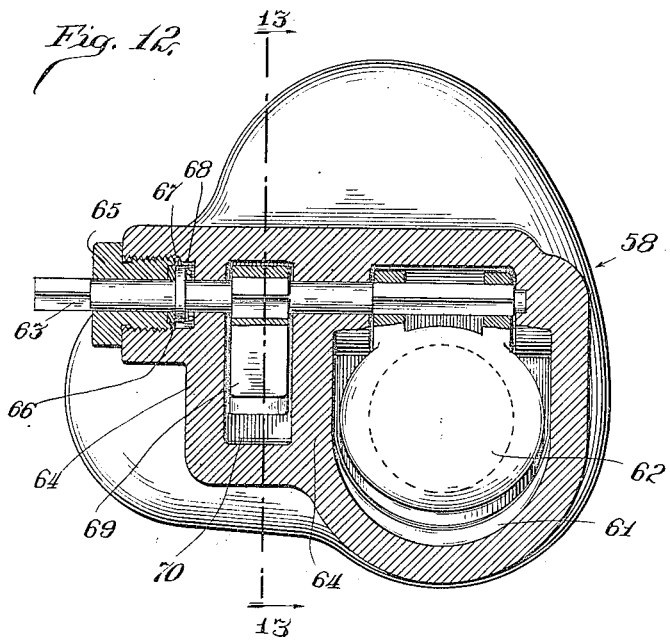
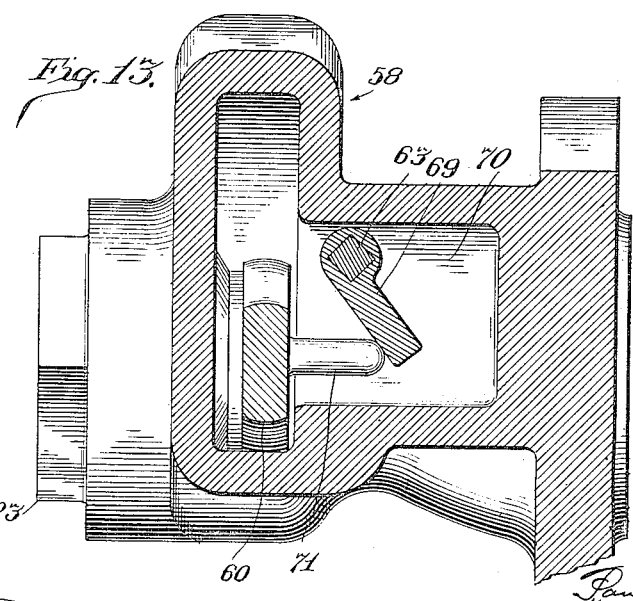

Patented June 5, 1923.

1,457,613

UNITED STATES PATENT OFFICE.

PAUL C. WITHROW AND WILLIAM W. LEMEN, OF DENVER, COLORADO.

VALVE.

Application filed July 10, 1920. Serial No. 395,206.

*To all whom it may concern:*

Be it known that we, PAUL C. WITHROW and WILLIAM W. LEMEN, citizens of the United States, and residents of Denver, in the county of Denver and State of Colorado, have invented certain new and useful Improvements in Valves, of which the following is a description, reference being had to the accompanying drawings, which form a part of our specification.

Our invention relates to valves and more particular to what are known as blow-off valves especially of the type employed on locomotive boilers and the like. The object of our invention is to provide a valve which will permit of replacement of the valve members or discs or repair and the refinishing of the valve-face and seat when necessary, without the necessity of draining the pipe-line or boiler, or other receptacle, for which our improved valve serves as an outlet.

Valves of this character as heretofore constructed, and especially in locomotive practice, when repairing of the valve or refinishing of the valve and seat became necessary, required the quenching or drawing of the fire, relieving the boiler of all pressure and the consequent draining of all water. As the locomotive boilers generally contain a large quantity of water, it is apparent that such practice has resulted in the loss of thousands of gallons of water as well as the loss of thousands of pounds of coal; with the further loss and expense, both in time and material, induced by the refilling and reheating of the water to the same temperature as originally obtained. In addition to the loss and expense referred to, such practice also resulted in the loss of service of the locomotive for a great many hours and the additional detrimental effect on the boiler-sheets produced through the changes in temperature.

The purpose of our invention is to provide a valve which will obviate the necessity for emptying or draining the pipe-line or receptacle and therefore avoid the incidental waste of material and time.

The objects and advantages of our invention will be more fully comprehended from the following detailed description of the accompanying drawings, wherein:—

Figure 3 is a cross sectional view taken on the line 3—3 of Figure 2 looking in the direction of the arrows.

Figure 4 is a sectional view, substantially similar to Figure 2, illustrating a modified form.

Figure 5 is a detail view, in perspective, of the inner valve member.

Figure 6 is a similar sectional view of another modified form of our invention.

Figure 7 is a detail sectional view taken on the line 7—7 of Figure 6 looking in the direction of the arrows.

Figure 8 is a sectional view, substantially similar to Figure 2, illustrating a further modified form of our invention.

Figure 9 is a detail sectional view taken on the line 9—9 of Figure 8 looking in the direction of the arrows.

Figure 10 is a vertical sectional view of another modification; the view being taken on the line 10—10 of Figure 11 looking in the direction of the arrows.

Figure 11 is a sectional view taken on the line 11—11 of Figure 10 looking in the direction of the arrows and illustrating the valve in open position.

Figure 12 is a sectional view taken on the offset line 12—12 of Figure 10 looking in the direction of the arrows.

Figure 13 is a sectional view taken on the line 13—13 of Figure 12 looking in the direction of the arrows.

Figure 1:
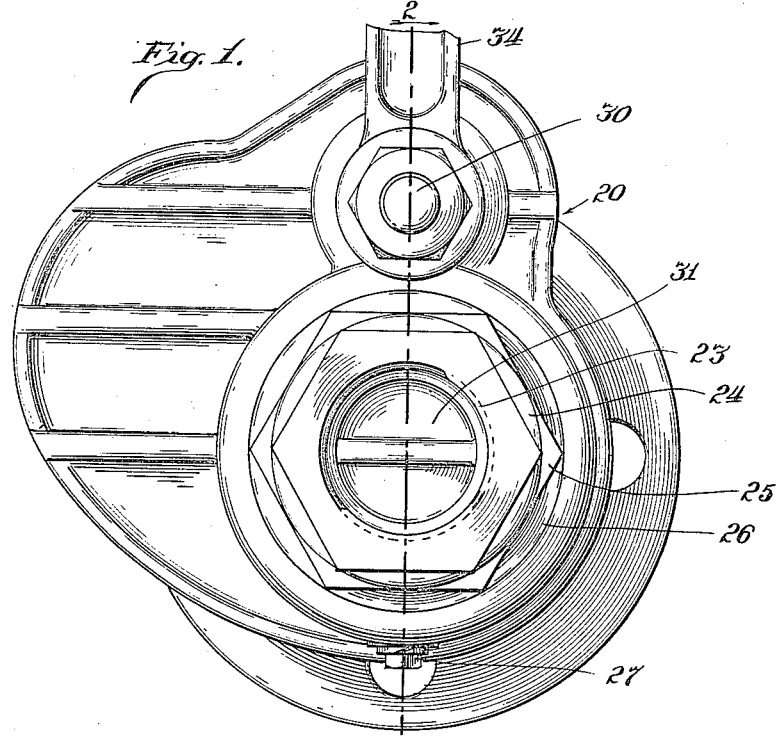
Figure 1 is a plan view of the outlet side of our improved valve, with a portion of the operating lever broken away.

In the exemplification of the invention as illustrated in the first three figures of the drawings, 20 designates the body or casing of the valve which is adapted to be secured in any suitable manner to a boiler or receptacle and provided with the inlet passage 21, which is shown preferably provided with a suitable spider or strainer 22 for the purpose of preventing large particles of solid matter being forced into the valve-body where it would be apt to interfere with proper operation of the valve mechanism. The opposite side of the valve-body is provided with a valve-seat 23 which constitutes the outlet passage for the valve body; the valve-seat 23 being in the nature of a threaded thimble or member which enables the valve-seat to be screwed into place; the positioning of the valve-seat being determined by an annular flange 24 which is brought into abutting relation with a supplementary valve-seat 25 disposed about the valve-seat 23. The valve-seat member 23 is internally threaded to permit connection with any suitable pipe-line or other element. The face or wall of the valve-body 20 is provided with a tapped opening sufficiently large to receive both valve-seat members 23 and 25. The supplementary valve-seat 25 is also shown preferably provided with a flange at 26 adapted to fit into a kerf or recess formed in the face of the valve-body; and the supplementary valve-seat 25, after the same has been screwed into place, may be held against accidental removal by means of a suitable set-screw, as at 27 in Figure 2. The valve-body 20 is so formed that when the composite valve-seats 23—25 are properly screwed into place, a valve-chamber will be provided intermediate of the rear wall of the body and said valve-seats for the reception of the valve. The chamber is disposed toward one side of the valve-seat in order to permit sufficient oscillation of the valve-disc 28 which is carried by an arm or lever 29 mounted on a shaft 30 which is disposed through the outer face or wall of the valve-body at a point above or to one side of the valve-seats, as clearly shown in Figure 2. The valve-disc 28 on its one face is provided with a threaded depression or socket adapted to receive a valve-disc 31 which screws into the threaded socket of valve member 28. The valve-disc 31, when the valve is in closed position, is adapted to seat against valve-seat 23 and when the valve-disc or member 31 is in place, valve-member 28 is normally out of seating relation with its valve-seat. The valve-members and the valve-seats 23 and 25 are so correlated that valve-seat 23 provides a seat for valve-member 31, while valve-seat 25 is intended to constitute a seat for valve-member 28.

The valve-body 20 is apertured to receive a bushing or guide member 32 for the operating shaft 30; and this bushing or guide 32 is preferably reduced at its outer end to provide a proper seat for a coil spring 33 which is adapted to exert pressure on an operating handle or lever 34 secured to the end of shaft 30 and thereby tending to maintain a suitable fluid-tight relation between a collar or flange 35 (formed on the inner end of shaft 30 intermediate of the arm or lever 29 and the bushing 32) and the bushing 32 by means of suitable packing 36; such relation being provided by the outward pressure of spring 33 on the operating lever 34 which is suitably secured to the outer end of shaft 30.

Figure 2:
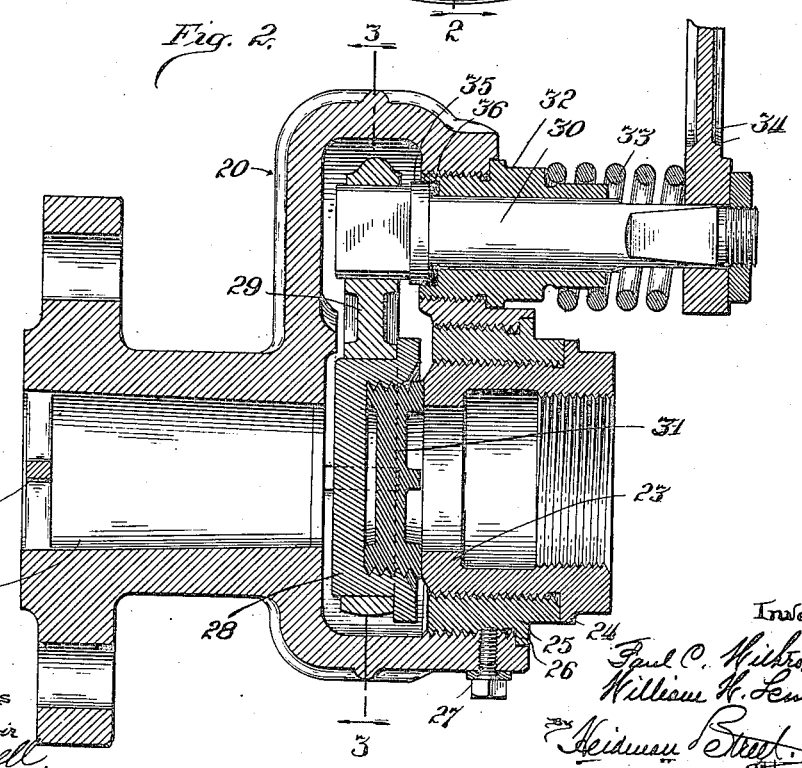
Figure 2 is a cross sectional view taken on the line 2—2 of Figure 1 looking in the direction of the arrows.

As is evident from the construction shown and described, in the event that removal of valve-seat 23 or valve-member 31 becomes necessary, for repair or refinishing, this may be accomplished upon closing the valve, then removing valve-seat 23 from the supplementary valve-seat member 25 and by reason of such removal, the pressure of the fluid against the composite valve, namely against the valve-member 28, will force valve-member 28 to the right in Figure 2 and therefore into seating relation with valve-seat member 25, with the result that escape of fluid will be prevented. The removal of valve-seat member 23 will permit access to valve-member 31 and enable the same to be unscrewed from valve-member 28 so as to permit regrinding or replacement. The refinished or new valve-disc member 31 may be screwed back into valve-member 28, after which the valve-seat member 23 is then screwed back into place. The replacement of member 23 will force the composite valve-member with the carrying-arm or lever 29 back to the position illustrated in Figure 2. The operation of our improved valve is the same as the operation of valves at present in use, as the proper manipulation of lever 34 will swing the composite valve 28—31 laterally in the valve-chamber and permit the flow of fluid from port or passage 21 out through valve-seat member 23; while the reverse operation of the valve will bring the composite valve-member into seating position as shown in Figure 2.

In Figure 4 we illustrate a modification of our improved valve, with the casing 20, the valve-seat members 23 and 25, as well as the operating shaft and arm or lever 29 substantially identical with those illustrated in Figure 2. In the construction shown in Figure 4, the auxiliary valve-member 37 is in the nature of a disc provided with a countersunk face on the outlet side having beveled sides adapted to receive the beveled disc member 38, which in this construction is merely in the nature of a ring and preferably provided with a web or rib 39 which permits easy manipulation of the valve-member 38. The valve-member 38 is more clearly shown in the detail view, Figure 5, where it is shown in perspective, having sides beveled to correspond with the beveled sides of the countersunk portion of valve-member 37, with the enlarged or thick portion of the valve member 38 arranged to seat on the seat member 23. With member 38 on its seat 23, valve member 37 will be held away from the auxiliary seat member 25. As the valve-member 37 comprises a solid disc, it is evident that the fluid in port or passage 21 will be prevented from passing through seat-member 23 when the composite valve is in closed position as indicated in Figure 2; and in the event of the removal of seat-member 23, as well as valve-member 38, it will be seen that the pressure of the fluid against valve member 37 will cause the latter to seat on auxiliary seat member 25 and therefore prevent the outflow of the fluid; valve member 37, like valve member 28, being shown preferably flanged at 40 to prevent the too far movement of the valve-member through the opening in the arm or lever 29.

In Figure 6, we illustrate another modified form of our invention wherein the valve-casing or housing 41 is provided with a wall or partition 42 intermediate of the rear and front walls of the housing, that is to say, intermediate of the inlet passage 21 and the valve-seat member 23 which is screwed into a suitable opening formed in the wall of the housing, instead of being screwed into the valve-seat member 25 as in the construction shown in Figures 2 and 4. In this construction, a partition or intermediate wall 42 is provided with a threaded aperture into which valve-seat member 43 is screwed or secured; the extent of insertion of the valve-seat being determined by a flange 44 formed on the member 43. The valve-seat member 43 is in the nature of a ring in order to provide a fluid passage therethrough. In the particular exemplification of this modified form of our invention, the operating shaft 30 is provided with an extension 45 disposed through an opening in partition or intermediate wall 42 and the shaft 30, on opposite sides of the partition 42, is provided with the valve-controlling arms or levers 29 and 46. The arm 29 is substantially similar to that previously described and shown in the other forms of our invention. The arm 29 is provided with a suitable disc-valve 47 removably mounted in the arm or lever 29 and normally adapted to seat against the seat member 23 to prevent passage of fluid through the blow-off valve. The operating arm or lever 46, disposed to the opposite side of the partition or intermediate wall 42, may be of any suitable construction to permit freedom, in a seating direction, to the valve-member 48 carried thereby. The lever 46 is shown with its free end kerfed to receive the circular valve-member 48 which, however, is permitted movement toward valve-seat member 43 when such movement is made possible. The valve-member 48, preferably adjacent its perimeter, is provided with a lug or pin 49 adapted to engage with the valve-member 47 so that the fluid-pressure against valve-member 48 will likewise be transmitted to valve-member 47 and thereby firmly maintain the latter on its seat-member 23 so that flow of fluid (which may find passage about valve-member 48 when the latter is in the position shown in Figure 6) will not be permitted through seat-member 23. The lug or pin 49 is preferably of length sufficient to normally maintain valve-member 48 off its seat 43 when valve member 47 is in operative position; and in order to permit complete opening of the valve members, we have shown the valve-seat member 43, at a proper point on its inner perimeter, provided with a slot or socket as at 50 in Figure 7, into which pin 49 may pass upon rotation of operating shaft 30 and oscillation of both arms or levers 29 and 46 with their respective valve-members. The pin 49 being formed adjacent the perimeter of the valve-member 48 enables a complete opening of both valves so as to entirely uncover the passage through the valve-casing or housing.

We have shown the auxiliary valve 48 as being operated by the lever or arm 46 secured to an extension of the shaft 30, but it is evident that an independent shaft may be provided for auxiliary valve-member 48 so as to enable independent operation of the valve-members if desired. With the construction shown in Figure 6, in the event of any repair being necessary on seat-member 23 or valve-member 47, it is evident that their removal will permit the force of fluid against valve member 48 to induce a seating of valve-member 48 against seat-member 43, because valve member 47 will no longer be in contact with the lug or pin 49 of valve-member 48. Seating of valve-member 48 against seat-member 43 will prevent the outward flow of the fluid.

In Figures 8 and 9, we show a further modified form of the invention wherein the housing 51 is substantially similar to the housing 20 in Figures 2 and 4, except that the rear wall in proximity to the passage 21 is enlarged or provided with a boss-portion threaded to receive a seat-member 52 adapted to be screwed into the enlargement, as clearly shown in Figure 8; the wall being so formed, however, as to provide a chamber 53 in which valve-disc 54 is adapted to oscillate. The opposite or front wall of the housing 51 is provided with a valve-seat member 23 secured in place and substantially similar to valve-seat member 23 illustrated in Figure 6, to provide a proper seat for the valve-disc 55 carried by the operating arm 29 secured to the end of the operating shaft 30. The valve-member 55, like valve-member 47, is loosely mounted in a suitable opening in arm or lever 29 so as to be free to move toward its seat 23 through the pressure of the fluid on the rear or inner side of the member. The valve-member 55 differs from valve-member 47 in that it is provided with a lug or projection 56 preferably formed integral with the valve-member adjacent its outer periphery as shown in Figure 9. This lug or projection 56 is adapted to extend into a socket or pocket 57 formed in the adjacent face of valve-member 54, so that movement of valve-member 55, by means of lever 29 will be transmitted to valve-member 54 through the lug or projection 56, causing valve-member 54 to be oscillated laterally into open or closed position when valve-member 55 is likewise operated. With this construction, upon the removal of valve-seat member 23 and valve-member 55, valve-member 54 will be permitted to come into firm seating relation with valve-seat member 52 and thus prevent the outflow of the fluid.

In Figures 10 to 13, we disclose another modified form of the invention wherein the shell or housing 58 is formed to provide a suitable chamber for the oscillation or movement of valve-disc 59 which is mounted in the end of the operating arm or lever 60, shown in Figure 11, which, in turn, is secured to the end of the operating shaft 30 as in the previously described constructions. The valve-housing 58 is provided with an intermediate wall formed to provide the inclined seat 61 on the inlet passage side 21 of the valve-housing. The passage 21 is shown somewhat enlarged to permit oscillation of a valve-member 62 which is mounted on the end of a hinge-pin or shaft 63 rotatably mounted transversely of the housing as shown in Figures 11 and 12. The housing 58 is provided with suitable boss-formations or ribs, as at 64 in Figure 12, to provide suitable mounting for the rock-shaft or hinge-pin 63, which may be disposed or extended through the wall of the housing as shown in Figure 12 to permit independent operation of the rocker-shaft or hinge-pin 63, and therefore also of the auxiliary valve member 62, if desired. A suitable fluid-tight relation with the outer end of the rocker-shaft or hinge-pin 63 is effected by means of the gland-nut 65 which seats against the packing 66 and presses the same against the flange or collar 67 formed on the rocker-shaft 63; while the opposite side thereof is preferably under compression induced by a suitable spring member 68, see Figure 12. At a point intermediate of its ends, rocker-shaft 63 is provided with an arm or lug 69 adapted to extend into a chamber 70 formed by the extensions or ribs of housing 58, as shown in Figure 12. The arm or lug 69 is intended to bear against the end of a pin or extension 71, which, in the specific exemplification, is preferably secured at a suitable point to the arm or lever 60; the extension 71 being arranged to travel in a suitable passage formed in the intermediate wall of the housing 58; the outer end of the pin or extension 71 being preferably rounded to enable it to freely ride on the arm or extension 69, see Figure 13; and the pin or extension 71 is preferably of such length as to maintain valve-member 62 slightly off its seat 61 when valve-member 59 is in closed position (see Figure 10) and thus permit the pressure of the fluid to be exerted against valve-member 59 to firmly maintain the latter on its seat 23. When desired, the extension 71 might be formed directly on valve member 59. With this construction, the operation of valve-member 59, through proper oscillation of lever or arm 60, to move valve-member 59 off its seat, will cause the pin or extension 71 to ride along arm or lug 69, secured to rocker-shaft or hinge-pin 63, in a direction which will induce lug or arm 69 to move upwardly in Figure 13 and thus cause such rocking of shaft 63 as will force valve-member 62 upwardly into complete open position to allow a free passage of the fluid from inlet 21 through the passage in the intermediate wall which provides the seat 61 and through valve-seat member 23. It is apparent that the mere operation of shaft 30, with its connected arm or lever 60, will induce the simultaneous unseating or opening of both valve-members 59 and 62, while the extension of rocker-shaft or hinge-pin 63, through the wall of the housing, as shown in Figure 12, will also permit the independent movement or operation of valve-member 62 to open position, if desired.

In this construction, the removal of seat-member 23 and valve-member 59, will permit auxiliary valve-member 62 to be forced to its seat, because arm or lever 60 may then shift toward the right in Figure 10 sufficient to move the extension or pin 71 out of holding contact with the arm or extension 69 and allow slight rocking movement of hinge-pin or rocker-arm 63 sufficient to enable auxiliary valve-member 62 to firmly seat on its seat 61 and thus prevent passage of fluid through the housing. Upon the replacement of valve-member 59 into the socket or aperture in the end of arm or lever 60 will cause the latter, upon insertion of seat-member 23 to force the arm or lever 60 away from the outer wall of the housing and into the position shown in Figure 10, which movement, in turn, will again force the pin or extension 71 against the end of extension or arm 69 so as to rock shaft 63 sufficiently to move valve-member 62 slightly off its seat, as shown in Figure 10 and allow the fluid to exert its pressure against valve-disc member 59.

We have shown and described what we believe to be some of the simplest and best embodiments of our invention which are adapted to overcome the serious objections encountered with blow-off valves as heretofore constructed, but further modifications in certain details of construction may be made without, however, departing from the spirit of our invention.

What we claim and desire to secure by Letters Patent is:—

1. A valve of the character described, comprising a housing provided with inlet and outlet ports and a pair of valve-seats, a pair of valve members located within the housing, each adapted to seat on a different one of said valve-seats and seating in the direction of the flow through said housing, one of said valve members being normally held in unseated position and means whereby both valve members may be simultaneously controlled.

2. A valve of the character described, comprising a housing provided with inlet and outlet ports, a pair of concentric valve-seats, and a pair of concentric and oscillatably mounted valve-members each adapted to seat on one of said valve-seats, with the relation between the valve-members being such that one of the members is normally held off its seat.

3. A valve of the character described, comprising a housing provided with inlet and outlet ports, a pair of valve-seats, a pair of oscillatingly mounted valve-members each adapted to seat on one of said valve-seats, and a single member whereby both valve-members may be simultaneously moved to and from their respective valve-seats and one of the valve-members normally held out of complete seating position while the other valve-member is seated.

4. A valve of the character described, comprising a housing provided with an inlet and an outlet port, a pair of removable valve-seats disposed about the outlet port, a pair of valve-members, each adapted to seat on one of said valve-seats in the direction of flow through said housing, the one valve-member being removably mounted on the other valve-member and arranged to normally hold the latter off its seat while the first valve-member is seated.

5. A valve of the character described, comprising a housing provided with an inlet and an outlet port, a pair of removable valve-seats disposed about said outlet port, and a pair of valve-members adapted to seat on said valve-seats, said members being operatively connected so that seating of the one member will take place upon the removal of one of the valve-seats or the other valve-member.

6. A valve of the character described, comprising a housing provided with an inlet and an outlet port, the outlet port being surrounded by a valve-seat, a disc-valve oscillatably mounted to swing toward said valve-seat, the disc valve and said valve-seat being removable through said outlet port, means disposed intermediate of said valve and the inlet port and in operative relation with the valve, said means being closable with the pressure of the fluid upon removal of said disc-valve, and means whereby the valve may be oscillated.

7. A valve of the character described, comprising a housing provided with a passage therethrough, a removable valve-seat disposed about the outlet of said passage, a pair of valve-members oscillatably mounted in the housing and adapted to control the flow of fluid through said passage, means whereby one of the valve-members is held off its seat while the other member is in seated position, and means whereby said valve-members may be actuated.

8. A valve of the character described, comprising a housing provided with a passage therethrough, a pair of concentric valve-seats removably secured at the outlet of said passage, a pair of disc-valves adapted to seat on said valve-seats, the one disc-valve being removably mounted on the other and adapted to be held against its seat by the fluid-pressure on the other disc-valve, while said last mentioned disc-valve is seatable upon the removal of one of said valve-seats or the first-mentioned disc-valve, and an operating member in which the disc-valves are removably secured.

PAUL C. WITHROW.
WILLIAM W. LEMEN.

Witnesses:
G. HEIDMAN,
F. A. FLORELL.